Oct. 21, 1924.

H. L. BLOOD 1,512,574

CONTROL SYSTEM FOR MACHINE TOOLS

Filed Oct. 7, 1921

Inventor
H. L. Blood,
By Wayne B Wells
Attorney

Oct. 21, 1924.  
H. L. BLOOD  
1,512,574  
CONTROL SYSTEM FOR MACHINE TOOLS  
Filed Oct. 7, 1921 2 Sheets-Sheet 2

INVENTOR  
H.L. Blood  
BY Wayne B Wells  
ATTORNEY

Patented Oct. 21, 1924.

1,512,574

UNITED STATES PATENT OFFICE.

HAROLD L. BLOOD, OF NORTH PLAINFIELD, NEW JERSEY, ASSIGNOR TO NILES-BEMENT-POND COMPANY, OF NEW YORK, N. Y., A CORPORATION OF NEW JERSEY.

CONTROL SYSTEM FOR MACHINE TOOLS.

Application filed October 7, 1921. Serial No. 506,003.

*To all whom it may concern:*

Be it known that I, HAROLD L. BLOOD, a citizen of the United States, residing at North Plainfield, in the county of Somerset and State of New Jersey, have invented certain new and useful Improvements in Control Systems for Machine Tools, of which the following is a specification.

My invention relates to control systems and particularly control systems for operating machine tools.

One object of my invention is to provide a control system for governing the operation of a main motor to effect relative movement between a cutting tool and a work-carrying table and for governing the operation of an auxiliary motor to index the work-carrying table.

Another object of my invention is to provide a control system that shall operate a main motor in a forward and in a reverse direction for reciprocating a cutting tool relative to a work-carrying table and that shall operate an auxiliary motor in accordance with the reciprocating movements of the cutting tool to index a work-carrying table while providing means for insuring the main motor against operation during indexing.

Another object of my invention is to provide a control system of the above indicated type having a main motor for reciprocating the cutting tool, that shall selectively operate unit switches by a pilot switch for operating the main motor in a forward and in a reverse direction and for effecting a dynamic-braking circuit, that shall operate the pilot switch and an auxiliary switch by the movement of the reciprocating tool while interlocking the main switch units through the auxiliary switch to prevent operation of the main motor when the auxiliary motor is indexing the work-carrying table, and that shall lock the work-carrying table against movement during operation of the cutting tool.

Another object of my invention is to provide a control system for operating a machine tool having a cutting tool reciprocated relative to a work-carrying table, that shall operate the cutting tool at a slower speed during the downward stroke than during the upward stroke, when cutting on the downward stroke, and that shall provide means for reversing the speed ratio between the upward and the downward movement of the cutting tool in case the cutting operation is effected during the upward stroke in place of during the downward stroke of the cutting tool.

Another object of my invention is to provide a control system for operating a machine tool having a reciprocating member operated by a main motor, that shall include a circuit breaker for opening the motor circuits and for completing a dynamic braking circuit independent of the position of the pilot switch and the control apparatus for normally operating the motor and that shall prevent the resetting of the circuit breaker unless the pilot switch, which controls the motor in accordance with the operation of the reciprocating member, is in the off position.

A further object of my invention is to provide a control system of the above indicated character having the main motor for operating a tool-carrying reciprocating member, main unit switches for operating the motor in a forward and in a reverse direction and for completing a dynamic-braking circuit, and an accelerating switch for controlling the acceleration of the motor in a forward and in a reverse direction, that shall control the main unit switches and the accelerating switch at will by means of a portable switch and that shall operate the main unit switches and the accelerating switch automatically by means of a pilot switch in accordance with the operation of the reciprocating member, the circuits through the pilot switch being interlocked through the portable switch.

My control system is particularly adapted for operating a machine to shape the so called Maag gear wheels. A machine adapted to be operated by the system described in this application is disclosed in the copending application of Lyndon C. Cole, Serial No. 521,839 filed December 12, 1921.

The control system comprises a main motor which is adapted to operate a reciprocating member carrying a cutting tool. An auxiliary motor is provided for indexing a work-carrying table which cooperates with the reciprocating tool. The main motor is controlled by two unit switches and an accelerating switch, and such switches are controlled by a pilot switch. A pendent switch is also provided for controlling the unit switches and the accelerating switch, at will, independent of the pilot switch. The auxiliary motor is controlled by an indexing switch which in turn is operated by an auxiliary switch. The pilot switch and the auxiliary switch are operated by the reciprocating member in order to effect indexing of the work-carrying table in timed relation to the reciprocating movement of the cutting tool. A locking mechanism is operated by the reciprocating member for locking the indexing table against movement during the movement of the cutting tool and the energizing circuits for the main switch units and the accelerating switch are interlocked through the auxiliary switch in order to prevent operation of the main motor during indexing of the work-carrying table. Dynamic-braking circuits are completed for the main motor and the auxiliary motor to effect a quick stopping of them.

A circuit breaker is provided for opening the circuits of the motors in case of low voltage or overload conditions existing on the motor circuits. The energizing circuit for the circuit breaker is interlocked through the pilot switch in order to prevent resetting of the circuit breaker when the pilot switch is in an operative position. A number of emergency push buttons are distributed about the machine in order to release the circuit breaker in case of accident. Corresponding reset buttons are also provided for resetting the circuit breaker when the pilot switch is in the off position. The circuit breaker completes a dynamic-breaking circuit through the main motor independent of the main unit switches.

The machine is normally operated to effect a cutting operation on the downward stroke of the cutting tool and to effect the downward movement of the cutting tool at a slower rate than the return upward movement of the tool. However, it is often desirable to effect a cutting operation upon the upward movement of the cutting tool. In my control system a switch member is provided for so changing the circuit connections through the main-motor shunt-field winding as to operate the upward movement of the cutting tool at a slower rate than the downward movement of such tool.

Figure 1:
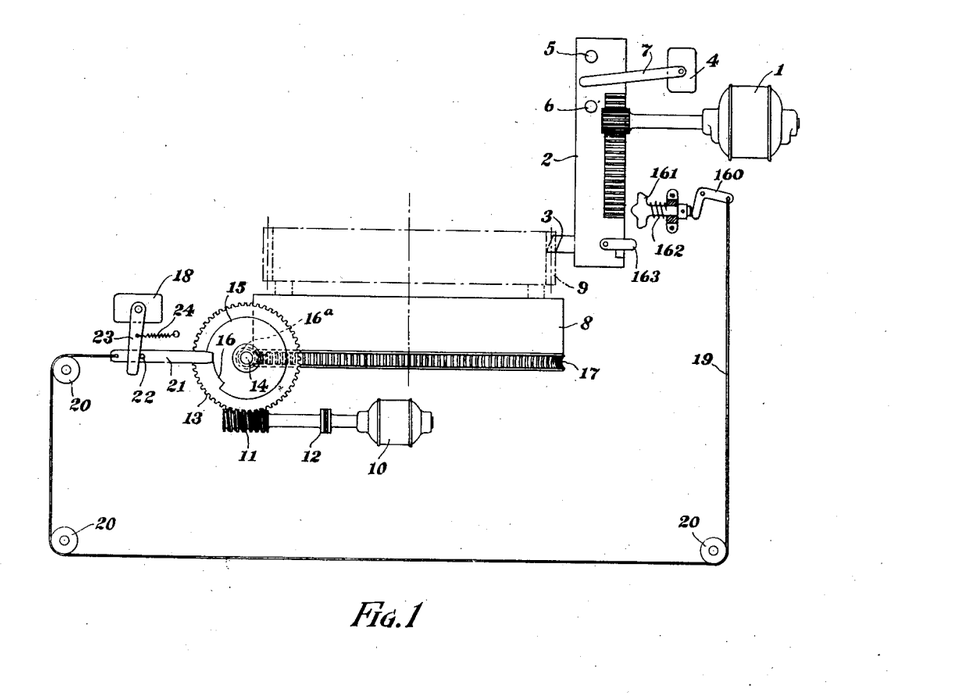
Figure 1 is a diagrammatic view illustrating the operative relation of the main and the auxiliary motors.

Referring to Fig. 1 of the drawings, a main motor 1 is provided for reciprocating a member 2 which carries a cutting tool 3. The operative connection between the motor 1 and the reciprocating member 2 is diagrammatically illustrated as a rack and pinion connection. However, the motor may be connected to the reciprocating member in any suitable manner and in the manner disclosed in the application of Lyndon C. Cole above referred to. A pilot switch 4 is operated by the reciprocating member 2 for governing the operation of the main motor 1. Two dogs 5 and 6, which project from the side of the reciprocating member 2, are adapted to engage an arm 7 at the extreme ends of the movement of the reciprocating member. The arm 7 is directly connected to the pilot switch 4. At the end of the downward stroke of the cutting tool, which is normally the cutting stroke, the dog 5 engages the arm 7 for so operating the pilot switch as to reverse the direction of rotation of the motor 1. When the cutting tool is at the end of the upward movement, dog 6 engages the arm 7 for reversing the direction of rotation of the motor to effect a downward movement of the cutting tool.

A table 8 is provided for supporting a piece of work 9 in operative relation to the cutting tool 3. The table 8 is illustrated as rotatably mounted for indexing the work 9 relative to the cutting tool 3. However, it is to be understood that my invention is not considered to be limited to a rotatable work-carrying table. An auxiliary motor 10 is provided for indexing the work relative to the cutting tool. The motor 10 operates a worm member 11 through a friction clutch 12. The worm member 11 is directly connected to a worm wheel 13 which is mounted on a shaft 14. A disk 15 having a notch 16 therein is also mounted on the shaft 14. A worm member 16ª which is operated by the shaft 12 is in mesh with worm teeth 17 which are formed on the table 8. Thus, the operation of the auxiliary motor 10 serves to effect movement of the work carrying table 8.

An auxiliary switch 18 is provided for governing the operation of the auxiliary motor 10. The auxiliary switch 18 is controlled by the reciprocating member 2 in order to effect indexing of the work-carrying table in timed relation to the movement of the cutting tool. Preferably a flexible cable 19, which is attached to a lever 160, is carried over suitable pulley wheels 20 to a bar 21. A pin 22, which projects from the bar 21, is engaged by an arm 23 which operates the auxiliary switch 18. A spring member 24 is provided for holding the arm 23 in engagement with the pin 22. The bar 21 not only serves to effect operation of the auxiliary switch 18 but also enters the notch 16 in the disk 15 for locking the work carrying table against operation when the cutting tool is in movement. The lever 160, which is connected to one end of the cable 19, is pivotally mounted on the machine adjacent to the pilot switch 4 and the reciprocating member 2. The lever 160 is operated by a spring pressed pin 161. The pin 161 is normally forced away from the lever 160 by means of a spring member 162. A dog 163, which is pivotally mounted on the reciprocating member 2, operates the pin 161 against the action of the spring member 162 to effect movement of the lever 160. The dog 163 is so positioned on the reciprocat'ng member as to effect operation of the pin 161 just before or simultaneously with the operation of the pilot switch 4 by means of the dog 6. The pivotal mounting of the dog 163 on the reciprocating member permits such dog to operate the pin 161 on the upward movement only of the reciprocating member. Thus, when the dog is moved upwardly, it effects movement of the p'n 161 for operating the auxiliary switch 18 to effect an indexing operation. When the dog moves downwardly past the pin no movement of such pin is effected.

In the structure above described, the reciprocating member 2 controls the pilot switch 4 and the auxiliary switch 18 to effect operation of the motor 1 for reciprocating the cutt'ng tool 3 and for operating the auxiliary motor 10 for indexing the work carrying table 8. The reciprocating member 2 also operates the bar 21 for locking the work carrying table 8 against movement when the cutting tool is in operation. The auxiliary sw:tch 18, in a manner to be hereinafter set forth, prevents operation of the main motor 1 during indexing of the work carrying table.

Figure 2:
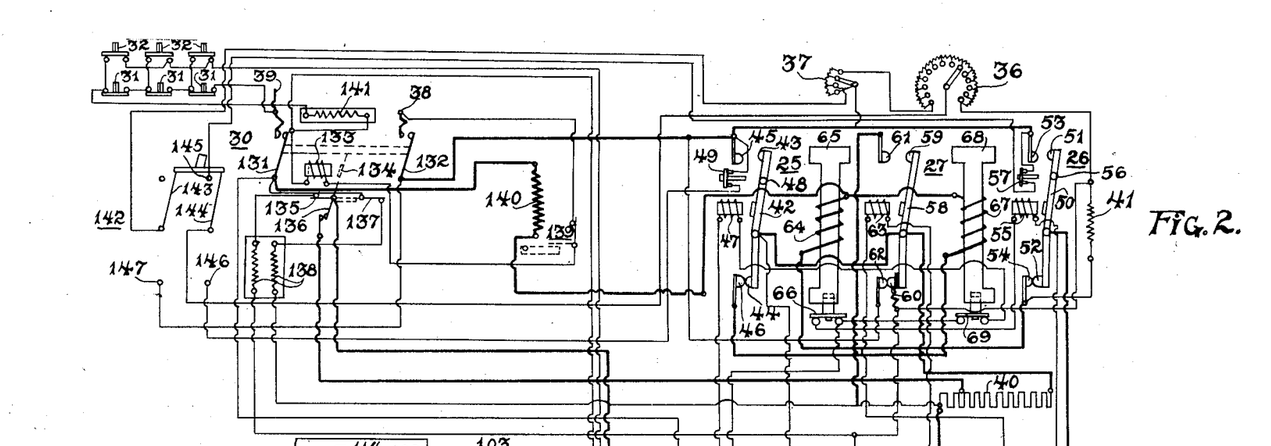
Fig. 2 is a diagrammatic view of the control circuits for the main and the auxiliary motor.

Referring to Fig. 2 of the drawings, the pilot switch 4 controls two main unit switches 25 and 26 and an accelerating switch 27 for governing the operation of the main motor 1 in a forward and in a reverse direction. The auxiliary switch 18 controls an indexing switch 28 for governing the operation of the aux'liary motor 10. A pendent switch 29, which is movable to any part of the machine, is provided for controlling the main unit switches 25 and 26 and the accelerating switch 27, independent of the pilot switch 4. The p'lot switch 4 is interlocked through the pendent switch 29 to prevent operation of the unit switches and the accelerating switch by the pilot switch when the pendent switch is in an operative position. A circuit breaker 30 is provided for opening the circuit of the motor 1 in case of low voltage or overload circuit conditions. A plural'ty of stop buttons 31 which are distributed in convenient positions around the machine are provided for opening the circuit breaker 30 in case of an emergency. A corresponding number of reset buttons 32 are distributed around the machine for resetting the circuit breaker.

As will be explained hereinafter, it is impossible to reset the circuit breaker 30 by means of the reset buttons 32 unless the pilot switch 4 is in the off position.

The main motor 1 comprises an armature 33, a shunt field-magnet winding 34 and an interpole winding 35. The shunt field-magnet winding 34 is adapted to be connected through resistors 36 and 37 across supply conductors 38 and 39 for varying the speed of the cutting tool in different directions. A resistor 40 is provided in circuit with the armature 33. A protective resistor 41 is also provided in the circuit of the field-magnet wind:ng 34.

The main unit switch 25 comprises a pivotally mounted switch arm 42 which carries two contact members 43 and 44. The contact member 43 is adapted to engage a stationary contact member 45, when the switch arm is in an operative position, and the contact member 44 is adapted to engage a stat'onary contact member 46 when the switch arm is in a released position as shown in the drawings. A main magnet 47 is provided for operating the switch arm 42. A pin 48, which projects from the switch arm 42, is adapted to operate a sw'tch 49 upon operation of the unit switch. The switch 49 serves to reduce the speed of the cutting tool when effecting a cutting movement on the upward stroke of the cutting tool. Switch 49, when closed during cutting on the upward stroke, short-circuits a portion of the resistor 36 and the resistor 37 from the circuit of the field-magnet winding 34. When the unit switch 25 is operated to effect a downward movement of the cutting tool, the switch 49 is operated to insert the resistors 36 and 37 in circuit with the field magnet winding 34 in case the cutting operation is being effected during the upward movement of the cutting tool.

The main unit switch 26 comprises a switch arm 50 which carries two contact members 51 and 52. The contact member 51 is adapted to engage a stationary contact member 53, when the switch arm 50 is moved to an operative position, and the contact member 52 is adapted to engage a stationary contact member 54 when the switch arm is in a released position as shown in the drawings. A main magnet 55 is provided for operating the switch arm 50. A pin 56, which projects from the side of the switch arm 50 is provided for operating a switch 57. The switch 57 serves to vary the speed of the main motor 1 when a cutting operation is being effected during the downward movement of the cutting tool. The unit switch 26 so controls the main motor 1 as to effect an upward movement of the cutting tool. The unit switch also operates the switch 57 to insert the resistors 36 and 37 in circuit with the field magnet winding 34 when a cutting operation is effected during the downward movement of the cutting tool. Thus, the upward movement is effected at a relatively rapid rate when a cutting operation is effected during the downward movement of the cutting tool.

The accelerating switch 27 comprises a switch arm 58 which carries two contact members 59 and 60. The contact member 59 is adapted to engage a stationary contact member 61 when the switch arm is in an operative position. The contact member 60, which is insulated from the switch arm 58, is adapted to engage a stationary contact member 62 when the switch arm is in a released position as shown in the drawings. An electromagnet 63 is provided for operating the switch arm 58.

A blow-out magnet comprising a coil 64 and a core 65 is provided for extinguishing the arcs formed by the main unit switch 25. A switch 66, which is included in the energizing circuit of the main magnet 55 for the unit switch 26, is operated by the coil 64 of the blow-out magnet. A similar blow-out magnet having a coil 67 and a core 68 is associated with the main unit switch 26. The coil 67 operates a switch 69 which is included in the energizing circuit of the magnet 47 for the main unit switch 25.

Figure 3:
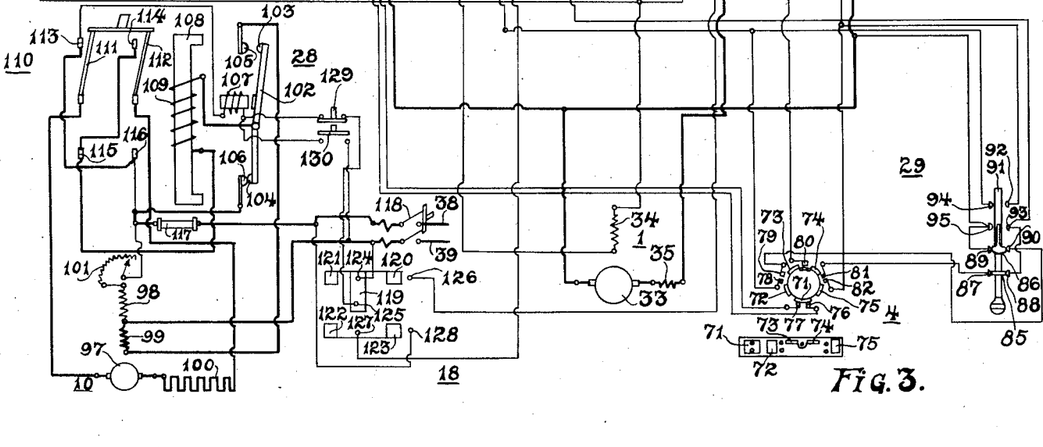
Fig. 3 is a developed view of the pilot switch.

The pilot switch 4 comprises five contact segments 71 to 75, inclusive, which are adapted to engage contact members 76 to 82, inclusive, according to the operative position of the pilot switch. The two contact segments 73 and 74 are electrically connected together for completing circuits through the coil 63 of the accelerating switch in a manner to be hereinafter set forth. The contact segment 71, which cooperates with the contact members 76 and 77, serves to prevent resetting of the circuit breaker 30 except when the pilot switch is in the off position, as shown in the drawings. The contact segment 72 serves to bridge the contact members 78 and 79 for completing a circuit through the magnet 47 of the main unit switch 25 to effect a downward movement of the cutting tool when the pilot switch 4 is operated by the pin 6 engaging the arm 7. The contact segment 75 bridges the contact members 81 and 82 near the downward movement of the cutting tool to energize the magnet 55 of the unit switch 26 to effect an upward movement of the cutting tool.

The pendent switch 29 is adapted to operate the main unit switches 25 and 26 and the accelerating switch 27 independent of the pilot switch 4. In the neutral position of the pendent switch as shown contact segments 85 and 86 serve to bridge the contact members 87 and 88, and 89 to 90. When the main motor 10 is controlled by the pendent switch, the rod 91 of the pendent switch, which carries the contact segment, is moved upwardly to open the bridging circuit across contact members 87 and 88 and the bridging circuit across the contact members 89 and 90. In such position of the pendent switch contact members 92 and 93 are bridged by giving the rod the movement of rotation in one direction and contact members 94 and 95 are bridged by giving the rod the movement of rotation in an opposite direction. The bridging of the contact members 92 and 93 serves to complete a circuit through the magnet 55 of the main unit switch 26. The bridging of the contact members 94 and 95 serves to complete a circuit through the main magnet 47 of the unit switch 25.

The auxiliary motor 10, which serves to index the work carrying table 8, comprises an armature 97, a shunt field-magnet winding 98, series field-magnet winding 99. A resistor 100 is inserted in circuit with the armature 97. A variable resistor 101 is inserted in circuit with the shunt field-magnet winding 98. The indexing switch 28, which controls the operation of the auxiliary motor 10, comprises a switch arm 102 which carries two contact members 103 and 104. The contact member 103 is adapted to engage a stationary contact member 105 when the switch arm is in an operative position. The contact member 104 is adapted to engage a stationary contact member 106 when the switch arm is in a released position as shown in the drawings. A magnet 107 is provided for operating the switch arm 102.

A blow-out magnet having a core 108 and a coil 109 is provided for extinguishing the arcs formed by the indexing switch 28. A double throw two pole switch 110 is provided for controlling the direction of indexing by the auxiliary motor 10. The switch 110 comprises two switch blades 111 and 112. When in the upward position, the switch blades 111 and 112 are adapted to respectively engage contact members 113 and 114 for so operating the auxiliary motor 10 as to effect indexing in a clockwise direction. When in the lower position, the switch blades 111 and 112 are adapted to respectively engage contact members 115 and 116 to effect indexing of the work carrying table in a counterclockwise direction. Any suitable fuse 117 is inserted in the circuit of the auxiliary motor. A switch 118 is provided for connecting the circuits of the auxiliary motor to the supply conductors 38 and 39.

The auxiliary switch 18 comprises contact segments 119 to 123 inclusive. In the indexing position, as shown in the drawings, the contact segment 119 serves to bridge contact members 124 and 125 for completing a circuit through the magnet 107 of the indexing switch 28. When the auxiliary switch 18 is moved to the running position, the contact segments 120 and 121 bridge contact members 124 and 126 for connecting the magnet 63 of the accelerating switch 27 to the supply conductor 39. Moreover, in the running position of the auxiliary switch, the contact segments 122 and 123 bridge contact members 127 and 128 for connecting either the magnet 47 of the main unit switch 25 or the magnet 55 of the main unit switch 26 to the supply conductor 38. By so connecting the operating magnets of the main unit switches and the accelerating switch through the auxiliary switch 18, it is impossible to operate the main motor 1 and the cutting tool while the auxiliary switch is in position for effecting an indexing operation. A suitable switch 129 is shown for opening the circuit of the magnet 107 at any time desired. A similar switch 130 is shown for closing the circuit of the magnet 107 at will.

The circuit breaker 30 comprises two switch blades 131 and 132 which are adapted to connect the circuits of the motor 1 to the supply conductors 38 and 39. A coil 133 operates an armature 134 for controlling the switch blades 131 and 132. The armature 134 also controls switch members 135, 136 and 137 for effecting an emergency dynamic-braking circuit through the motor 1 in case of abnormal circuit conditions. The emergency dynamic-braking circuit is effected through emergency braking resistors 138. A relay 139 having an energizing coil 140 in the circuit of the motor 1 is provided for controlling the energizing circuit of the coil 133. The stop buttons 31 as heretofore set forth serve to open the circuit of the coil 133 and the reset buttons 32 serve to complete a circuit through the coil 133. A holding resistor 141 is provided for connecting the coil 133 across the supply conductors independent of the reset buttons. The current supplied through the holding coil 131 is not sufficient for operating the circuit breaker but is sufficient to hold the circuit breaker in operative position.

A two-pole double-throw switch 142 is provided for reversing the speed ratio of the movement of the cutting tool in an upward and in a downward direction. The switch 142 comprises two switch blades 143 and 144. When in the upper position, the switch blade 144 engages a contact member 145 for connecting the switch 57 in circuit with the resistors 36 and 37. In such position of the switch 142 the downward movement of the cutting tool is effected at a slower rate than the upward movement of such tool. When the switch 142 is in the lower position, the switch blade 144 engages a contact member 146 for inserting the switch 49 in the circuit of the resistors 36 and 37. In such position of the switch 142 the upward movement of the cutting tool is effected at a slower rate than the downward movement of such tool. It should also be noted that in the lower position of the switch 142, the switch blade 143 engages a contact member 147 for short circuiting a portion of the resistor 37. The short circuiting of a portion of the resistor 37 lowers the maximum return speed of the cutting tool during cutting on the upward stroke so that the emergency braking may take place in a safe time. If such short circuit were not provided for a portion of the resistor 37, it is probable that upon failure of voltage during the return stroke the emergency brake would fail to operate in a satisfactory manner.

Assuming the portable pendent switch to be in the position shown, the switch 142 to be closed in the upper position for effecting a cutting operation on the downward stroke of the tool and the circuit breaker to be closed and the reciprocating member 2 near the end of the downward movement, the operation of the system is as follows: Near the end of the movement of the reciprocating member 2, the dog 5 operates the switch arm 7 to effect movement of the pilot switch 4. The contact segment 75 is moved to bridge the contact members 81 and 82. A circuit is completed through the coil 55 of the main unit switch 26 which extends from the supply conductor 38 through one blade of the switch 118, contact members 127 and 128, which are bridged by the contact segments 122 and 123 of the auxiliary switch now in the running position, switch 66, main magnet 55 of the unit switch 26, contact members 81 and 82, which are bridged by the segment 75, contact members 87 and 88, which are bridged by the switch segment 85, switch arm 42, contact members 44 and 46, coil 67, coil 140, and the switch blade 131 to the supply conductor 39.

The main unit switch 26 is operated for completing a circuit through the main motor 1 in such direction as to effect an upward movement of the reciprocating member 2 and the cutting tool 3. The circuit through the main motor 1 extends from the supply conductor 38 through the switch blade 132, contact members 53 and 51, switch arm 50, armature 33, winding 35, resistor 40, switch arm 42, contact members 44 and 46, coil 67 of the blow-out magnet, coil 140, and the switch blade 131 to the supply conductor 39.

Prior to the operation of the accelerating switch 27, the shunt field-magnet winding for the motor 1 is energized by a circuit which extends from the supply conductor 38 through the switch blade 132, contact members 62 and 60, field magnet winding 34, and the switch blade 131 to the supply conductor 39.

The contact segments 73 and 74 of the pilot switch bridge the contact members 79 and 80 for completing a circuit through the magnet 63 of the accelerating switch 27. The circuit through the magnet 63 extends from the supply conductor 38 through the switch blade 132, contact members 53 and 51 of the operated unit switch 26, contact arm 50, contact members 89 and 90, which are bridged by contact segments 86, contact members 79 and 80, which are bridged by the switch segments 73 and 74, magnet 63 of the accelerating switch 27, and contact members 124 and 126, which are bridged by the switch segments 120 and 121, to the supply conductor 39. Thus, the accelerating switch 27 is operated for excluding the resistor 40 from the circuit of the motor 1 to increase the motor speed.

The operation of the accelerating switch 27 opens the circuit previously traced through the shunt field-magnet winding 34 and a circuit through the resistors 36 and 37 is provided for such winding. The circuit for te field-magnet winding 34 extends from the supply conductor 38 through the switch blade 132, resistors 37 and 36, field-magnet winding 34, and the switch blade 131 to the supply conductor 39. During the upward movement of the cutting tool, the switch 57 is opened by the switch arm 50 to insert the resistors 36 and 37 in the circuit of the field-magnet winding to increase the speed of the return stroke.

Near the end of the upward stroke of the cutting tool, the pin 6 on the reciprocating member 2 operates the arm 7 for operating the pilot switch 4. The dog 163 operates the pin 161 to effect operation of the auxiliary switch 18. The pilot switch is moved from one extreme position to the opposite extreme position. The contact segment 75 is moved out of engagement with the contact members 81 and 82 and the contact segment 72 is moved to bridge the contact members 78 and 79. The contact segments 73 and 74 disengage the contact members 79 and 80 and bridge the contact members 80 and 81. When the contact segments 73 and 74 disengage the contact members 79 and 80, the accelerating switch 27 is released to insert the resistor 40 in circuit with the armature 33. When the contact segment 75 disengages the contact members 81 and 82, the circuit through the magnet 55 of the main unit switch 26 is opened and a dynamic-braking circuit through the main motor 1 is completed by the release of such unit switch. The dynamic-braking circuit through the motor extends from one terminal of the armature 33 through the resistor 40, switch arm 42, contact members 44 and 46, coils 67 and 64 of the blow-out magnets, contact members 54 and 52, and the switch arm 50 to the other terminal of the armature 33. The field-magnet winding 34 is connected across the supply conductors through the contact members 62 and 60 of the accelerating switch through the circuit heretofore traced. It should be noted the two coils 64 and 67 of the blow-out magnets are energized when a dynamic-braking circuit is flowing for operating the two switches 66 and 69 to prevent energization of either of the magnets 47 and 55. Consequently, it is impossible to operate either of the main unit switches 25 and 26 when a dynamic-braking current is flowing through the motor.

Although the pilot switch 4 is in position for operating the main unit switch 25 to effect a downward or cutting movement of the cutting tool, no such operation can be effected at this time inasmuch as the auxiliary switch 18 has been moved to the indexing position. In such position of the auxiliary switch 18, the energizing circuits for the magnets 47 and 55 of the main unit switches 25 and 26 and the magnet 63 for the accelerating switch are opened.

In the indexing position of the auxiliary switch 18, a circuit is completed through the magnet 107 of the indexing switch 128. The circuit through the magnet 107 extends from the supply conductor 38 through the contact member 113, magnet 107, switch 129, and the contact members 124 and 125, which are bridged by the contact segment 119 to the supply conductor 39. The indexing switch 28 is operated and a circuit is completed through the motor 10. The circuit through the motor extends from the supply conductor 38 through the contact member 113, switch blade 111, armature 97, resistor 100, switch blade 112, contact member 114, coil 109 of the blow-out magnet, switch arm 102, contact members 103 and 105, and series field-magnet winding 99 to the supply conductor 39. The shunt field-magnet winding 98 is directly connected through the resistor 101 across the supply conductors 38 and 39. With the switch 110 in the position shown, an indexing operation of the work carrying table is effected in a clockwise direction. With the switch in its lower position, the direction of current flowing through the armature 97 is reversed to effect an indexing operation in a counter-clockwise direction.

It should be noted the bar 21 is withdrawn from engagement with the disk 15 simultaneously with the operation of the pilot switch 4 and the auxiliary switch 18 by the reciprocating member 2. Thus, when the auxiliary motor 10 is energized the work carrying table is free to effect an indexing movement. When the disk 15 completes one rotation, the bar 21 is forced into the notch 16 by means of the spring member 24. The auxiliary switch 18 is moved from the indexing position to the running position simultaneously with the movement of the bar 21. Accordingly, the indexing operation is stopped and circuits are completed for operating the main motor 1 to effect a downward movement of the reciprocating member. The movement of the auxiliary switch 18 from the indexing to the running position opens the circuit of the coil 107 on the indexing switch 28. The indexing switch is released and a dynamic-braking circuit is completed through the indexing motor. The braking circuit extends from one terminal of the motor armature 97 through switch blade 111, contact members 113 and 116, contact members 104 and 106, switch arm 102, coil 109, contact members 114 and 115, switch blade 112, and the resistor 100 to the other terminal of the indexing-motor armature.

When the auxiliary switch 18 is moved to the running position, a circuit is completed for operating the unit switch 25. Such circuit extends from the supply conductor 38 through the switch 118, contact members 127 and 128, which are bridged by the switch segments 122 and 123, switch 69, main magnet 47 of the unit switch 25, contact members 78 and 79, which are bridged by the contact segment 72, contact members 90 and 89, which are bridged by the switch segment 86, switch arm 50, contact members 52 and 54, blow-out coil 64, coil 140, and switch blade 131 to the supply conductor 39. The switch 25 is operated for completing a circuit through the main motor 1 to effect a downward movement of the reciprocating member 2. The circuit through the main motor 1 extends from the supply conductor 38 through the switch blade 132, contact members 45 and 43, switch arm 42, resistor 40, winding 35, armature 33, switch arm 50, contact members 52 and 54, coil 64, coil 140, and the switch blade 131 to the supply conductor 39.

A circuit is completed for operating the accelerating switch 27 upon operation of the unit switch 25. The circuit for operating the accelerating switch extends from the supply conductor 38 through the switch blade 132, contact members 45 and 43, switch arm 42, contact members 88 and 87, which are bridged by the switch segment 85, contact members 81 and 80, which are bridged by the contact segments 73 and 74, coil 63, and the contact members 124 and 126, which are bridged by the switch segments 120 and 121 to the supply conductor 39. The accelerating switch 27 is operated for short circuiting the resistor 40 to increase the speed of the motor. Upon operation of the accelerating switch, the connection of the shunt field magnet winding 34 across the supply conductors is broken. Such field-magnet winding is connected across the supply conductors in circuit with a portion of the resistor 36. The circuit through the shunt field-magnet winding extends from the supply conductor 38 through the switch blade 132, switch 57, switch 142, a portion of the 132, switch 57, switch 142, a portion of the resistor 36, field-magnet winding 34, and switch blade 131 to the supply conductor 39. Inasmuch as only a portion of the resistor 36 is included in circuit with the field-magnet winding downward movement of the cutting tool is effected at a relatively slow speed.

The switch 49 is operated by the switch arm 42 but effects no change in the circuit of the shunt field magnet winding inasmuch as the switch 142 is in its upper position to effect a cutting operation during the downward movement of the reciprocating member. If the switch 142 is in the lower position in order to effect a cutting operation during the upward movement of the reciprocating member 2, the operation of the switch 49 by the contact arm 42 would serve to insert the resistors 36 and 37 in the circuit of the shunt field-magnet winding 34.

Near the end of the downward movement of the reciprocating member 2, the dog 5 engages the arm 7 of the pilot switch 4 to reverse the position of the pilot switch and repeat the above cycle of operations.

In case of an emergency, any one of the switches 31 which are distributed around the machine may be operated for effecting a quick stopping of the motor. The switches 31 as heretofore set forth are connected in circuit with the coil 133 of the circuit breaker and the operation of any one of such switches opens the circuit through the coil 133 to release the circuit breaker. The circuit breaker is reset by means of one of the switches 32. However, it is impossible to reset the switch 30 until the pilot switch is returned to neutral position. The energizing circuit for operating the circuit breaker must be completed through the controller segment 71 and the contact members 76 and 77 of the pilot switch. The pilot switch 4 must be in the neutral position, as heretobefore set forth, in order to bridge the contact members 76 and 77 by the contact segment. Upon release of the circuit breaker, an emergency dynamic-braking circuit is completed through the main motor 1.

Modifications in the system, and in the arrangement and location of parts may be made within the spirit and scope of my invention and such modifications are intended to be covered by the appended claims.

What I claim is:

1. In a control system for a machine tool, the combination with a reciprocating member carrying a cutting tool, and a work-carrying table associated with said cutting tool, of a main motor for operating the reciprocating member, an auxiliary motor for indexing the work-carrying table, and means controlled by the reciprocating member for governing the operation of said motors.

2. In a control system for a machine tool, the combination with a reciprocating member carrying a cutting tool, and a work-carrying table associated with said cutting tool, of a main motor for operating the reciprocating member, an auxiliary motor for indexing the work-carrying table, and means controlled by the reciprocating member for governing the operation of said motors and for locking the work-carrying member between indexing operations.

3. In a control system for a machine tool, the combination with a work-carrying table, and a cutting tool for engaging the work on said table, of a main motor for effecting relative movement between the work-carrying table and the cutting tool, an auxiliary motor for indexing the work-carrying table, and means comprising a pilot switch and an auxiliary switch governed in accordance with the operation of the main motor for respectively controlling the main and the auxiliary motor.

4. In a control system for a machine tool, the combination with a reciprocating member carrying a cutting tool, a work-carrying table associated with said cutting tool, a main motor for operating said reciprocating member, and an auxiliary motor for indexing the work-carrying table, of a pilot switch operated by the reciprocating member for controlling the main motor, and means comprising an auxiliary switch operated by the reciprocating member for controlling the auxiliary motor.

5. In a control system for a machine tool, the combination with a reciprocating member carrying a cutting tool, a work-carrying table associated with said cutting tool, a main motor for operating said reciprocating member, and an auxiliary motor for indexing the work-carrying table, of a pilot switch operated by the reciprocating member for controlling the main motor, and an auxiliary switch operated by the reciprocating member for controlling the auxiliary motor and for preventing operation of the main motor when the auxiliary motor is indexing the table.

6. In a control system for a machine tool, the combination with a reciprocating member carrying a cutting tool, a work-carrying table associated with said cutting tool, a main motor for operating said reciprocating member, and an auxiliary motor for indexing the work-carrying table, of a pilot switch automatically operated by the reciprocating member for controlling the main motor, a portable switch for controlling the operation of the main motor at will independent of the pilot switch, and an auxiliary switch operated by the reciprocating member for controlling the auxiliary motor.

7. In a control system for a machine tool, the combination with a reciprocating member carrying a cutting tool, a work-carrying table associated with said cutting tool, a main motor for operating said reciprocating member, and an auxiliary motor for indexing the work-carrying table, of a pilot switch automatically operated by the reciprocating member for controlling the main motor, a portable switch for controlling the operation of the main motor at will independent of the pilot switch, and an auxiliary switch operated by the reciprocating member for controlling the auxiliary motor and for preventing simultaneous operation of the main and the auxiliary motor.

8. In a control system for a machine tool, the combination with a reciprocating member carrying a cutting tool, a main motor for operating the reciprocating member, and a pilot switch controlled by the reciprocating member for governing the operation of said main motor in a forward and in a reverse direction, of a work-carrying table, means comprising an auxiliary motor for indexing said table, an auxiliary switch operated by said reciprocating member for controlling the operation of said auxiliary motor in accordance with the operation of the main motor and the cutting tool, and means controlled by the reciprocating member for locking the work-carrying table between indexing operations.

9. In a control system for a machine tool, the combination with a reciprocating member carrying a cutting tool, a main motor for operating the reciprocating member, and a pilot switch operated by the reciprocating member for governing the operation of said main motor in a forward and in a reverse direction, of a work-carrying table, means comprising an auxiliary motor for indexing said table, an auxiliary switch operated by said reciprocating member for controlling the operation of said auxiliary motor in accordance with the operation of the main motor and the cutting tool, means controlled by the reciprocating member for locking the work-carrying table between indexing operations, and means operated by the auxiliary switch for preventing the simultaneous operation of the main motor and the auxiliary motor.

10. In a control system for a machine tool, the combination with a reciprocating member carying a cutting tool, a work-carrying table associated with said cutting tool, a main motor for operating said reciprocating member, and an auxiliary motor for indexing the work-carrying table, of a pilot switch automatically operated by the reciprocating member for controlling the main motor, a portable switch for controlling the operation of the main motor at will independent of the pilot switch, an auxiliary switch operated by the reciprocating member for controlling the auxiliary motor and for preventing simultaneous operation of the main and the auxiliary motor, and means controlled by the reciprocating member for preventing movement of the work-carrying table between indexing operations.

11. In a control system for a machine tool, the combination with a reciprocating member carrying a cutting tool, a work-carrying table associated with the reciprocating member, a main motor for operating the reciprocating member, main unit switches for operating the main motor in a forward and in a reverse direction, and a pilot switch for operating said unit switches in accordance with the operation of said reciprocating member, of a work-carrying table, means comprising an auxiliary motor for indexing said table, an indexing unit switch for controlling said auxiliary motor and for completing a dynamic-braking circuit therethrough, and an auxiliary switch operated by the reciprocating member for controlling said indexing unit switch.

12. In a control system for a machine tool, the combination with a reciprocating member carrying a cutting tool, a work-carrying table associated with the reciprocating member, a main motor for operating the reciprocating member, unit switches for operating the main motor in a forward and in a reverse direction, and a pilot switch for operating said unit switches in accordance with the operation of said reciprocating member, of a rotatable work-carrying table, means comprising an auxiliary motor for indexing said table, an auxiliary switch controlled by said reciprocating member for governing the operation of said auxiliary motor, said auxiliary switch also serving to prevent the operation of any of said unit switches when the auxiliary motor is operating.

13. In a control system for a machine tool, the combination with a reciprocating member carrying a cutting tool, a work-carrying table associated with the reciprocating member, a main motor for operating the reciprocating member, main unit switches for operating the main motor in a forward and in a reverse direction, and a pilot switch for operating said unit switches in accordance with the operation of said reciprocating member, of a work-carrying table, means comprising an auxiliary motor for indexing said table, an indexing unit switch for controlling said auxiliary motor and for completing a dynamic-braking circuit therethrough, and an auxiliary switch operated by the reciprocating member for controlling said indexing unit switch.

14. In a control system for a machine tool, the combination with a reciprocating member carrying a cutting tool, a work-carrying table associated with said reciprocating member, a main motor for operating the reciprocating member, main unit switches for operating the main motor in a forward and in a reverse direction and for completing a dynamic-braking circuit therethrough, an accelerating switch for controlling the acceleration of the main motor when operating in a forward and in a reverse direction, and a pilot switch operated by said reciprocating member for operating the main unit switches and the accelerating switch, of a work-carrying table, means comprising an auxiliary motor for indexing said table, an indexing unit switch for controlling said auxiliary motor and for completing a dynamic-braking circuit therethrough, and an auxiliary switch operated by the reciprocating member for controlling the indexing unit switch and for preventing operation of the accelerating switch of the main unit switches when the indexing unit switch is in operative position.

15. In a control system for a machine tool, the combination with a reciprocating member, a main motor for reciprocating said member, and means automatically operated by the reciprocating member for reversing the direction of rotation of the motor and for rotating the motor at a faster rate in one direction than in the opposite direction, of means comprising a switch member for changing the operation of said automatic means to reverse the speed ratio between the rotation of the motor in a forward and in a reverse direction.

16. In a control system for a machine tool, the combination with a reciprocating member, a main motor for operating the reciprocating member, a pilot switch operated by the reciprocating member, and control means operated by said pilot switch for so operating the motor as to effect operation of the reciprocating member at different speeds in opposite directions, of means comprising a switch member for reversing the speed ratio of the reciprocating member in an upward and a downward direction.

17. In a control system for a machine tool, the combination with a reciprocating member, a main motor for reciprocating said member, unit switches for operating the motor in a forward and in a reverse direction and for completing a dynamic-braking circuit therethrough, a pilot switch operated by the reciprocating member for controlling said unit switches, of means comprising resistors in circuit with the motor field-magnet winding and varied by said unit switches to operate the motor at different rates of speed in opposite directions, and a switch member for changing the relation of said resistors to the field-magnet winding to reverse the speed ratio between the rotation of the motor in a forward and in a reverse direction.

18. In a control system for a machine tool, the combination with a main motor, unit switches for controlling the operation of the main motor, and a pilot switch for selectively operating said unit switches, of a circuit breaker in the main motor circuit for opening such circuit independent of said unit switches, and means for preventing the resetting of said circuit breaker when the pilot switch is in an operative position.

19. In a control system for a machine tool, the combination with a main motor, unit switches for operating the motor in a forward and in a reverse direction and for completing a dynamic-braking circuit therethrough, and a pilot switch for controlling the operation of said unit switches, of a circuit breaker in the main motor circuit for automatically opening the motor circuit upon abnormal circuit conditions, and means for preventing the resetting of the circuit breaker when the pilot switch is in an operative position.

20. In a control system for a machine tool, the combination with a reciprocating member, a main motor for operating said reciprocating member, and means comprising a pilot switch automatically operated by the reciprocating member for governing the operation of the main motor to effect a number of reciprocations of said member, of a circuit breaker for opening the circuit of the main motor independent of the pilot switch, and means for preventing the resetting of the circuit breaker when the pilot switch is in an operative position.

21. In a control system for a machine tool, the combination with a reciprocating member, a main motor for operating said reciprocating member, and means comprising a pilot switch operated by said reciprocating member for governing the operation of said main motor to continuously reciprocate said member, of an electro-magnetically operated circuit breaker for opening the circuit of the main motor independent of the pilot switch, emergency switches for releasing the circuit breaker at will, means for automatically releasing the circuit breaker upon abnormal circuit conditions, and means for preventing the resetting of the circuit breaker when the pilot switch is in an operative position.

22. In a control system for a machine tool, the combination with a reciprocating member, a main motor for operating the reciprocating member, and a pilot switch operated by said reciprocating member for governing the operation of said main motor, of an electro-magnetically operated circuit breaker for opening the circuit of the main motor independently of the pilot switch, emergency switches for releasing the circuit breaker at will, means for automatically releasing the circuit breaker upon abnormal circuit conditions, means for completing a dynamic-braking circuit through the main motor upon release of the circuit breaker, and means for preventing the resetting of the circuit breaker when the pilot switch is in an operative position.

In testimony whereof, I hereto affix my signature.

HAROLD L. BLOOD.